United States Patent
Trushin et al.

(10) Patent No.: US 10,840,579 B2
(45) Date of Patent: Nov. 17, 2020

(54) ANTENNA FOR A LOGGING-WHILE-DRILLING TOOL

(71) Applicant: Schlumberger Technology Corporation, Sugar Land, TX (US)

(72) Inventors: Alexander Trushin, Stonehouse (GB); Tianxia Zhao, Stafford, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 73 days.

(21) Appl. No.: 15/759,528

(22) PCT Filed: Aug. 31, 2016

(86) PCT No.: PCT/US2016/049549
§ 371 (c)(1),
(2) Date: Mar. 13, 2018

(87) PCT Pub. No.: WO2017/048506
PCT Pub. Date: Mar. 23, 2017

(65) Prior Publication Data
US 2019/0148811 A1     May 16, 2019

Related U.S. Application Data

(60) Provisional application No. 62/218,905, filed on Sep. 15, 2015.

(51) Int. Cl.
| | | |
|---|---|---|
| *H01Q 1/04* | (2006.01) | |
| *G01V 3/28* | (2006.01) | |
| *E21B 47/13* | (2012.01) | |
| *G01V 3/30* | (2006.01) | |
| *E21B 47/12* | (2012.01) | |
| *G01V 3/18* | (2006.01) | |
| *E21B 41/00* | (2006.01) | |
| *E21B 49/00* | (2006.01) | |

(52) U.S. Cl.
CPC ............... *H01Q 1/04* (2013.01); *E21B 41/00* (2013.01); *E21B 47/13* (2020.05); *E21B 49/00* (2013.01); *G01V 3/18* (2013.01)

(58) Field of Classification Search
CPC .......... G01V 3/28; G01V 3/30; E21B 47/122; E21B 47/12; E21B 47/13; E21B 47/138; H01Q 1/04
See application file for complete search history.

(56) References Cited

U.S. PATENT DOCUMENTS 5,892,460 A      4/1999   Jerabek et al.
6,483,310 B1 *  11/2002   Meador ................... G01V 3/28
                                                                        324/338

(Continued)

OTHER PUBLICATIONS

International Search Report and Written Opinion issued in International Patent Application PCT/US2016/049549, dated Dec. 13, 2016. 14 pages.

*Primary Examiner* — Catherine Loikith

(57) ABSTRACT

A downhole tool includes a chassis having a bore formed axially-therethrough. An antenna is positioned radially-outward from the chassis. A collar is positioned radially-outward from the antenna. A window is defined radially-through the collar. An insert is positioned in the window. The insert is made at least partially of a ceramic material.

15 Claims, 7 Drawing Sheets

(56) References Cited

U.S. PATENT DOCUMENTS

| | | | |
|---|---|---|---|
| 7,692,428 B2 * | 4/2010 | Clark | E21B 47/011 |
| | | | 324/338 |
| 8,497,673 B2 * | 7/2013 | Wang | G01V 3/28 |
| | | | 324/166 |
| 2004/0149434 A1 | 8/2004 | Frey et al. | |
| 2007/0216415 A1 | 9/2007 | Clark et al. | |
| 2008/0284440 A1 | 11/2008 | Moore | |
| 2011/0316542 A1 | 12/2011 | Frey et al. | |

* cited by examiner

ANTENNA FOR A LOGGING-WHILE-DRILLING TOOL

CROSS-REFERENCE TO RELATED APPLICATIONS

The present application is the United States national phase of International Patent Application No. PCT/US2016/049549, filed Aug. 31, 2016, and entitled "Antenna for a Logging-While-Drilling Tool," which claims the benefit of, and claims priority to U.S Provisional Application 62/218,905 filed Sep. 15, 2015, the entirety of which is incorporated by reference.

FIELD OF THE INVENTION

Embodiments described herein generally relate to downhole tools. More particularly, such embodiments relate to an antenna for a logging-while-drilling ("LWD") tool.

BACKGROUND INFORMATION

A conventional LWD tool includes an antenna wrapped around a metallic collar. A layer of fiberglass is positioned around the antenna. A layer of rubber is positioned around the fiberglass. A metallic shield is positioned around the rubber. The shield includes windows, and the electromagnetic signals are transmitted through the windows. For example, the antenna may transmit the electromagnetic signals through the windows, receive the electromagnetic signals through the windows, or both. The shield may protect the layers underneath; however, as the strength of the shield increases with fewer and smaller windows, so too does the attenuation of the electromagnetic signals passing therethrough.

At high temperatures (e.g., greater than 175° C.), the rubber layer may begin to lose its physical integrity. This may lead to liquid and/or gas from the wellbore leaking through the rubber layer, which may saturate the antenna. This may cause the physical properties of the antenna to change. For example, antenna may become out of tune. In addition, the liquid and/or gas may expand when a pressure drop occurs, which may lead to bubbles and cracks in the rubber layer.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A downhole tool is disclosed. The downhole tool includes a chassis having a bore formed axially-therethrough. An antenna is positioned radially-outward from the chassis. A collar is positioned radially-outward from the antenna. A window is defined radially-through the collar. An insert is positioned in the window. The insert is made at least partially of a ceramic material.

In another embodiment, the downhole tool includes a chassis having a bore formed axially-therethrough. An antenna is positioned radially-outward from the chassis. An area between the chassis and the antenna is from about 10 $cm^2$ to about 100 $cm^2$. A collar is positioned radially-outward from the antenna. Windows are defined radially-through the collar. The windows are axially-aligned with the antenna, and the windows are circumferentially-offset from one another. An insert is positioned in each of the windows. A width of at least one of the inserts increases moving radially-outward. At least one of the inserts is at least partially made of a ceramic material.

BRIEF DESCRIPTION OF THE DRAWINGS

So that the recited features may be understood in detail, a more particular description, briefly summarized above, may be had by reference to one or more embodiments, some of which are illustrated in the appended drawings. It is to be noted, however, that the appended drawings are illustrative embodiments, and are, therefore, not to be considered limiting of its scope.

DETAILED DESCRIPTION

Figure 1:
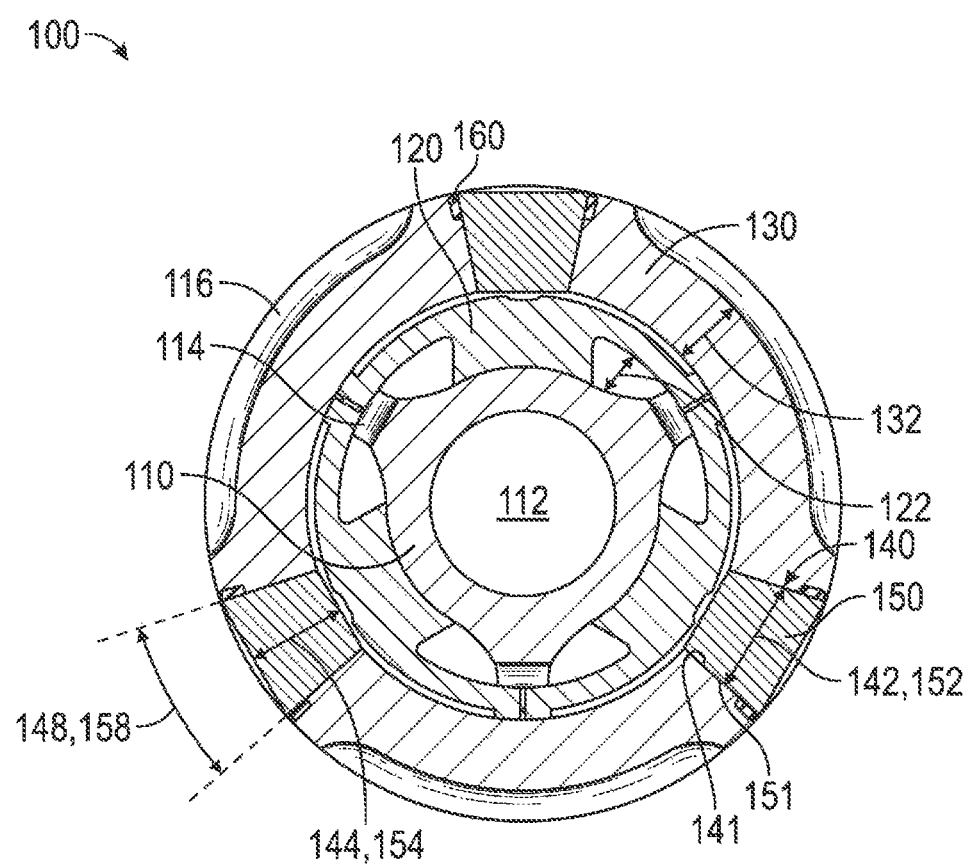
FIG. 1 depicts a cross-sectional view of a downhole tool, according to an embodiment.

FIG. 1 depicts a cross-sectional view of a downhole tool 100, according to an embodiment. The downhole tool 100 may be or include any tool having an antenna that is configured to transmit and/or receive signals while the downhole tool 100 is in a wellbore. As shown, the downhole tool 100 may be or include a logging-while-drilling ("LWD") tool. The LWD tool may be configured to measure one or more formation properties as a wellbore is being drilled or at any time thereafter. The formation properties may include resistivity, porosity, sonic velocity, gamma rays, and the like. In another embodiment, the downhole tool 100 may be or include a measurement-while-drilling ("MWD") tool. The MWD tool may be configured to measure one or more physical properties as the wellbore is being drilled or at any time thereafter. The physical properties may include pressure, temperature, wellbore trajectory, a weight-on-bit, torque-on-bit, vibration, shock, stick slip, and the like.

The downhole tool 100 may include an annular chassis 110. The chassis 110 may be substantially cylindrical and have a bore 112 formed axially-therethrough. The outer surface of the chassis 110 may include one or more ribs (three are shown: 114) that extend radially-outward therefrom. The ribs 114 may be circumferentially-offset from one another.

An antenna 120 may be positioned radially-outward from the chassis 110. The antenna 120 may be or include a wire that is wrapped around the chassis 110 multiple times to form a coil. The antenna 120 may be configured to transmit and/or receive electromagnetic signals. The electromagnetic signals may include data related to the formation properties, the physical properties, or the like that is being transmitted from the downhole tool 100 to the surface, or the electromagnetic signals may represent commands that are sent from the surface to the downhole tool 100.

The strength of the signals may be proportional to the (radial) distance 122 between the antenna 120 and the chassis 110. Said another way, the strength of the signals may be proportional to the area between the antenna 120 and the chassis 110. The area may be from about 10 cm$^2$ to about 100 cm$^2$ (or more) or from about 40 cm$^2$ to about 75 cm$^2$. For example, the area may be about 62 cm$^2$ (9.6 in$^2$).

Although not shown, the downhole tool 100 may include a plurality of antennas 120 that are axially-offset from one another. One or more of the antennas 120 may be configured to transmit electromagnetic signals, and one or more of the antennas 120 may be configured to receive electromagnetic signals. In at least one embodiment, the transmitter antennas 120 may be rotated with respect to the receiver antennas 120 (e.g., by about 60 degrees) to reduce or cancel the effects of field polarization.

The downhole tool 100 may also include an annular collar 130 that is positioned radially-outward from the chassis 110 and the antenna 120. The collar 130 may be made of metal. For example, the collar 130 may be made of P550 stainless steel. The collar 130 may have a (radial) thickness 132 of from about 0.5 cm to about 3 cm or from about 1 cm to about 2 cm. The collar 130 may serve to protect the antenna 120.

The collar 130 may have one or more windows (three are shown: 140) formed radially-therethrough. The windows 140 may provide a path or way which allows the electromagnetic signals to travel to and/or from the antenna 120. Although three windows 140 are shown, in other embodiments, the collar 130 may include a greater number of windows 140 or a lesser number of windows 140. The windows 140 may be axially-aligned with the antenna 120. The windows 140 may be circumferentially-offset from one another. As shown, the windows 140 are circumferentially-offset from one another by about 120 degrees. In other embodiments, the windows 140 may be circumferentially-offset from one another from about 30 degrees to about 60 degrees, from about 60 degrees to about 90 degrees, from about 90 degrees to about 120 degrees, from about 120 degrees to about 150 degrees, or from about 150 degrees to about 180 degrees. Although not shown in the cross-sectional view of FIG. 1, in some embodiments, the windows 140 may be axially-offset from one another.

The cross-sectional shape of the windows 140 (when the cross-section is through a plane that is perpendicular to the central longitudinal axis through the downhole tool 100) may be rectangular, frustoconical, or any other shape. As shown, the width 142 of the windows 140 may increase moving radially-outward (i.e., frustoconical). Thus, the sides 141 of the collar 130 that define each window 140 may be oriented at an angle 148 with respect to one another from about 1 degree to about 10 degrees, from about 10 degrees to about 20 degrees, from about 20 degrees to about 30 degrees, or more. The angle 148 may be substantially perpendicular to the direction of the principal hoop stress in the collar 130. The width 142 of the windows 140 proximate to the inner (radial) surface and/or the outer (radial) surface of the collar 130 may be from about 1 cm to about 10 cm, from about 1 cm to about 8 cm, or from about 1 cm to about 6 cm. The depth/height 144 of the windows 140 may be from about 0.5 cm to about 3 cm or from about 1 cm to about 2 cm.

An insert 150 may be at least partially positioned within each window 140. The inserts 150 may serve as a pressure barrier between the antenna 120 and the fluid outside the downhole tool 100. The inserts 150 may also prevent the collar 130 from collapsing by supporting the (circumferential) sides 141 of the collar 130.

The cross-sectional shape of the inserts 150 (when the cross-section is through a plane that is perpendicular to the central longitudinal axis through the downhole tool 100) may be rectangular, frustoconical, or any other shape. As shown, the width 152 of the inserts 150 may increase moving radially-outward (i.e., frustoconical). Thus, the (circumferential) sides 151 of each insert 150 may be oriented at an angle 158 with respect to one another from about 1 degree to about 10 degrees, from about 10 degrees to about 20 degrees, from about 20 degrees to about 30 degrees, or more. The width 152 of the inserts 150 proximate to the inner (radial) surface and/or the outer (radial) surface may be from about 1 cm to about 10 cm, from about 1 cm to about 8 cm, or from about 1 cm to about 6 cm. The depth/height 154 of the inserts 150 may be from about 0.5 cm to about 3 cm or from about 1 cm to about 2 cm. In at least one embodiment, the inserts 150 may be sized and shaped such that the (circumferential) sides 151 of the inserts 150 are in contact with the corresponding sides 141 of the collar 130 that form the window 140. For example, the sides 151 of the inserts 150 may form a friction or interference fit with the sides 141 of the collar 130.

The inserts 150 may be made from a ceramic material or any other electrically non-conductive material. For example, the inserts 150 may be made from glass, zirconia (e.g., Z-201 or Z-701), silicon nitride (e.g., SN-240), beryllium bronze, INCONEL® 718, or a combination thereof. The electromagnetic signals to and/or from the antenna 120 may pass through the ceramic material of the inserts 150 with minimal attenuation (e.g., when compared to the collar 130), as described in greater detail below.

In at least one embodiment, one or more seals (one is shown: 160) may be positioned between the collar 130 and each insert 150. As shown, a recess may be formed in the (circumferential) sides 141 of the collar 130 that define the windows 140, and the seal 160 may be positioned at least partially in the recess. The recess and the seal 160 may be positioned closer to the outer radial surface of the insert 150 than the inner radial surface of the insert 150. The seals 160 may be made from an elastomer (e.g., rubber). In at least one embodiment, the seals 160 may be O-rings.

The ribs 114 of the chassis 110 may support the inner surface of the collar 130 between the windows 140. Also, one or more recesses (three are shown: 116) may be formed in the outer surface of the collar 130. The recesses 116 may make the stress distribution on the sides of the windows 140 and/or inserts 150 more uniform.

In at least one embodiment, there may be no layer of rubber or fiberglass that wraps circumferentially-around the antenna 120 and/or the collar 130 that is positioned radially-outward from the antenna 120 and/or the collar 130. In addition, there may be no layers that wrap circumferentially-around the collar 130 and/or the inserts 150. Furthermore, there may be no additional shield around the collar 130 that would protect the rubber layer. The antenna 120 may not be subjected to downhole hydrostatic pressure and may be protected from any contact with drilling fluid, even by diffusion through the surrounding composite material.

Figure 2:
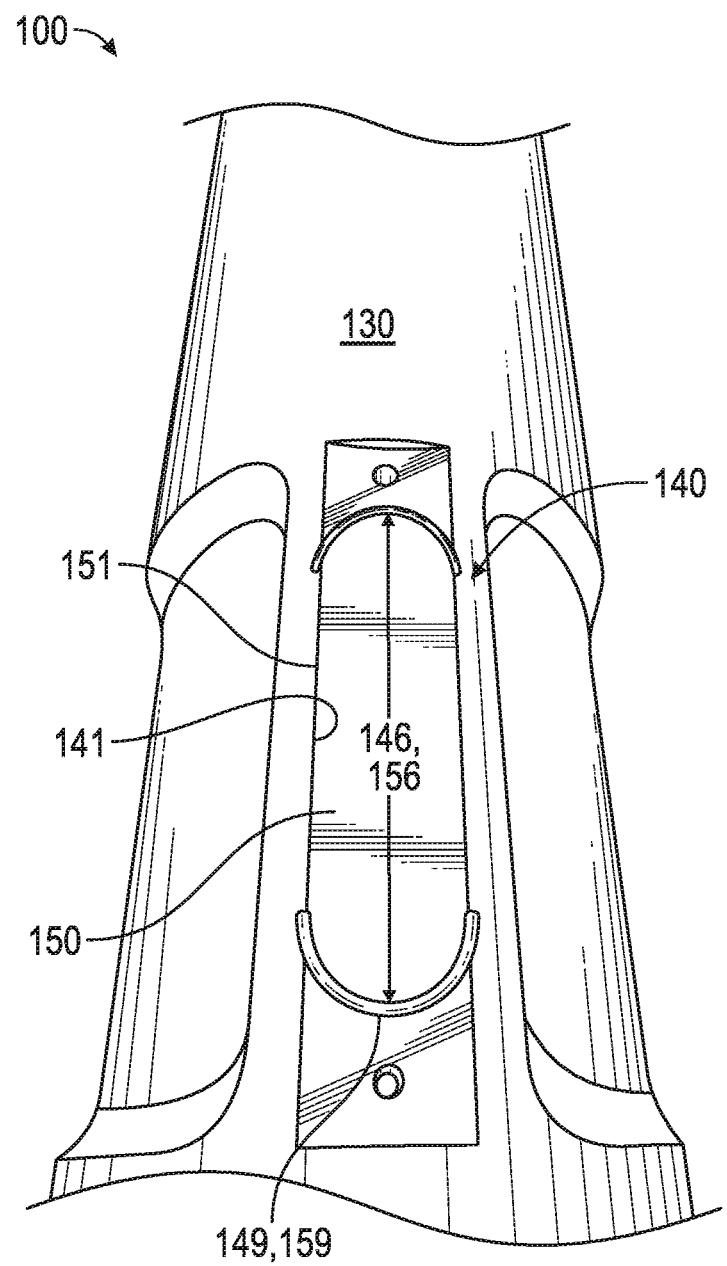
FIG. 2 depicts a radial view of the downhole tool showing an insert positioned within a window, according to an embodiment.

FIG. 2 depicts a radial view of the downhole tool 100 showing the insert 150 positioned within the window 140, according to an embodiment. The length 146 of the window 140 and/or the length 156 of the insert 150 may be from about 2 cm to about 20 cm (or more) or from about 5 cm to about 15 cm. The ends 149 of the windows 140 and/or the ends, 159 of the inserts 150 may be curved or rounded. Thus, as shown, the windows 140 and/or the inserts 150 may be substantially elliptical or ovular. In view of the widths 142, 152 discussed above, the radius of curvature may be from about 0.5 cm to about 5 cm, from about 0.5 cm to about 4 cm, or from about 0.5 cm to about 3 cm.

Figure 3:
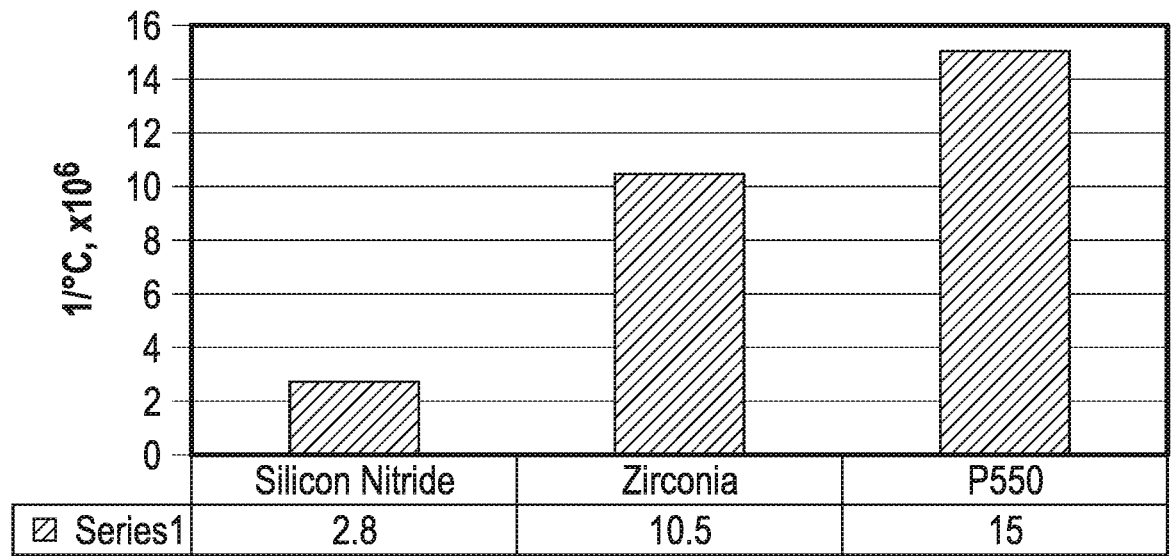
FIG. 3 depicts a graph showing the thermal expansion of illustrative materials for the insert, according to an embodiment.

FIG. 3 depicts a graph 300 showing the thermal expansion of illustrative materials for the inserts 150, according to an embodiment. As the collar 130 may be made from steel, the ceramic material of the inserts 150 may have a lower coefficient of thermal expansion ("CTE") than the collar 130. If the difference between the CTE of the collar 130 and the inserts 150 is too great, a gap may form between the inserts 150 and the collar 130 (e.g., proximate to the axial ends 159 of the insert 150) at high temperatures (e.g., above 175° C.). For example, the CTE of the inserts 150 may be greater than or equal to about 3 ppm/° C.

FIG. 3 shows the thermal expansion properties of two possible materials that may be used to form the inserts 150: silicon nitride and zirconia. FIG. 3 also shows the thermal expansion properties of a possible material that may be used to form the collar 130: P550 stainless steel. As may be seen, of the two materials shown for the inserts 150, the zirconia has a CTE that is higher and closer to the CTE of the P550 stainless steel of the collar 130. Therefore, of the two materials shown, the zirconia may be less likely to allow a gap to form between the inserts 150 and the collar 130 at high temperatures. Although two materials for the inserts 150 are shown in FIG. 3, it will be appreciated that other ceramic materials are also contemplated herein.

Figure 4:
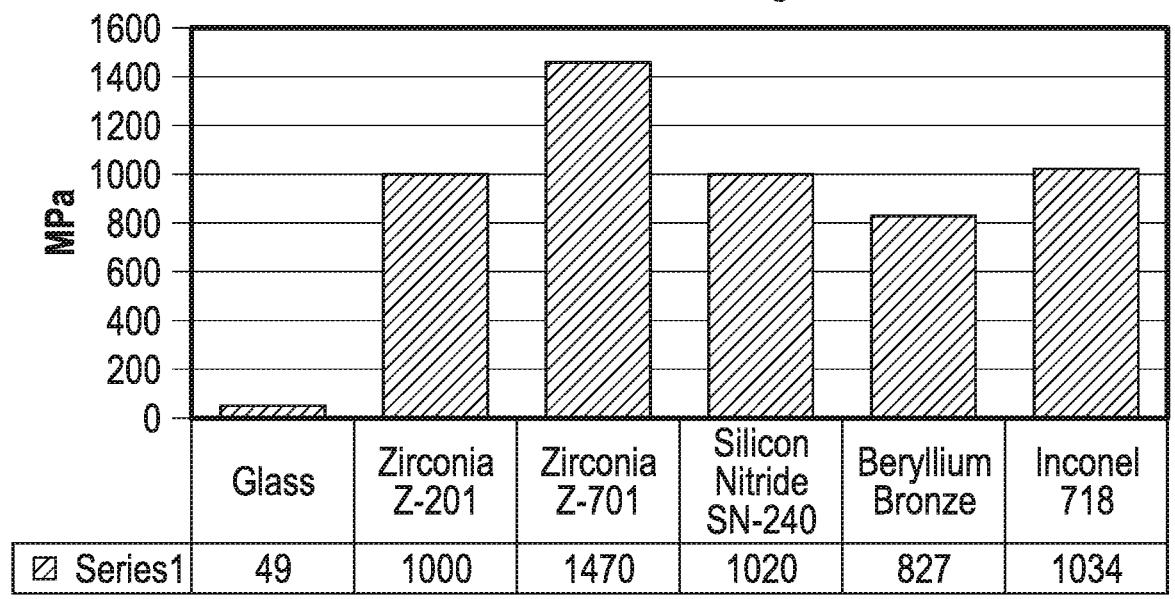
FIG. 4 depicts a graph showing the flexural strength of illustrative materials for the insert, according to an embodiment.

FIG. 4 depicts a graph 400 showing the flexural strength of illustrative materials for the inserts 150, according to an embodiment. The ceramic material used for the inserts 150 may be a high-strength material to withstand high hydrostatic pressure conditions in the wellbore. The material may also be electrically non-conductive to reduce interference with the electromagnetic signals to and/or from the antenna 120. FIG. 4 shows six possible materials that may be used to form the inserts 150. Of the materials listed, zirconia has the highest flexural strength (e.g., about 1470 MPa).

The size of a gap that forms between the collar 130 and the inserts at the ends of the inserts 150 (e.g., proximate to the axial ends 159 of the insert 150) may be estimated using Equation (1):

$$\delta = \Delta T \cdot \Delta CTE \cdot (L-W) \quad (1)$$

where δ represents the size of the gap, ΔT represents the change in temperature, ΔCTE represents the difference in the coefficient of thermal expansion, L represents the length 146 of the window 140, and W represents the average width 142 of the window 140. For inserts 150 made of zirconia dioxide, the gap increase at 200° C. may be about 0.089 mm for a window 140 that is 3.8 cm wide and 12.7 cm long. For an insert 150 made of zirconia oxide, the gap increase may be about 0.21 mm for a window 140 of the same size.

The gap may also depend upon the amount of bend or curvature of the collar 130 proximate to the antenna 120. The size of the gap may also be estimated using Equation (2):

$$\delta = DLS \cdot \frac{OD}{2} \cdot L \quad (2)$$

where DLS represents dogleg severity of the wellbore or curvature of the tool, and OD represents the outer diameter of the collar 130. Using Equation (2), the size of the gap may be about 0.10 mm at a DLS of 16°/30.5 meters for a window 140 of the same size. The electromagnetic modeling of a polarizer of the antenna 120 may be based on a finite element analysis ("FEA") solver and simulator. The use of such an FEA solver and simulator may include geometry-building, material/physics assignment, constant/variable definition, source assignment, mesh generating, solving and post-processing. The generated model may be based on the mechanical design, which may withstand the pressure and temperature in the wellbore. The models of the collar 130 and the chassis 110 from computer-aided drafting ("CAD") tools in may be imported into the FEA solver and simulator. Then, the signal level and impedance may calculated, which depends of the width 142, the length 144, the shape, and the number of windows 140 in the collar 130.

The level of the electromagnetic signals may be described by the magnetic moment, which is computed by linear square fitting the electromagnetic field of the numerical results from FEA solver and simulator on a spherical surface (e.g., having a radius of 1 meter). The dipole may be described with a dipole moment in 3 directions, as shown in Equation (3):

$$m = m_x \hat{x} + m_y \hat{y} + m_z \hat{z} \quad (3)$$

Where m represents the dipole, and $m_x$, $m_y$, and $m_z$ represent the dipole moment in the x, y and z directions, respectively. The minimum residual solution provides the most applicable fit ($m_x$, $m_y$, $m_z$), where each component is complex. Since the antenna 120 is axial in some downhole tools 100, the Z component of the magnetic moment may be more influential.

Another characteristic of the antenna 120 is the self impedance, which may be simplified as a simplified RL circuit, with an AC resistor in series with an inductor, at below resonant frequency. The resistance comes from various losses of the structure: the conductor loss from the collar 130, the shield, and the dielectric loss from the rubber and composite. The inductance may be from the antenna 120, which is a magnetic energy storage component. The impedance Z may be expressed by Equation (4) under time harmonic conditions (e.g., the source is sinusoidal with a fixed frequency):

$$Z = R + j\omega L \quad (4)$$

where Z represents the impedance, R represents the resistance, and L represents the inductance.

Figure 5:
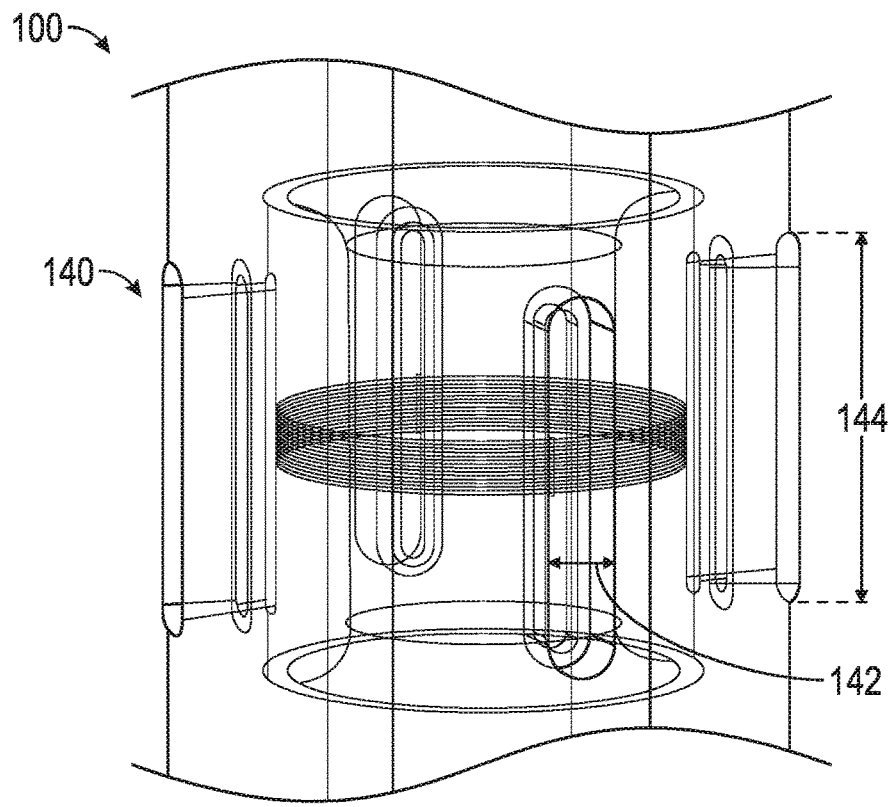
FIGS. 5-9 depict transparent perspective views of a portion of the downhole tool showing different embodiments of the windows formed therein.

FIGS. 5-9 depict transparent perspective views of a portion of the downhole tool 100 showing different embodiments of the windows 140 formed therein. More particularly, FIG. 5 depicts the collar 130 of the downhole tool 100 having four windows 140 formed therein. The windows 140 are circumferentially-offset from one another from about 75 degrees to about 105 degrees (e.g., 90 degrees). The width 142 of the windows 140 may be from about 1.5 cm to about 2.5 cm (e.g., about 1.9 cm), and the length 144 of the windows 140 may be from about 8 cm to about 16 cm (e.g., about 12 cm).

Figure 6:
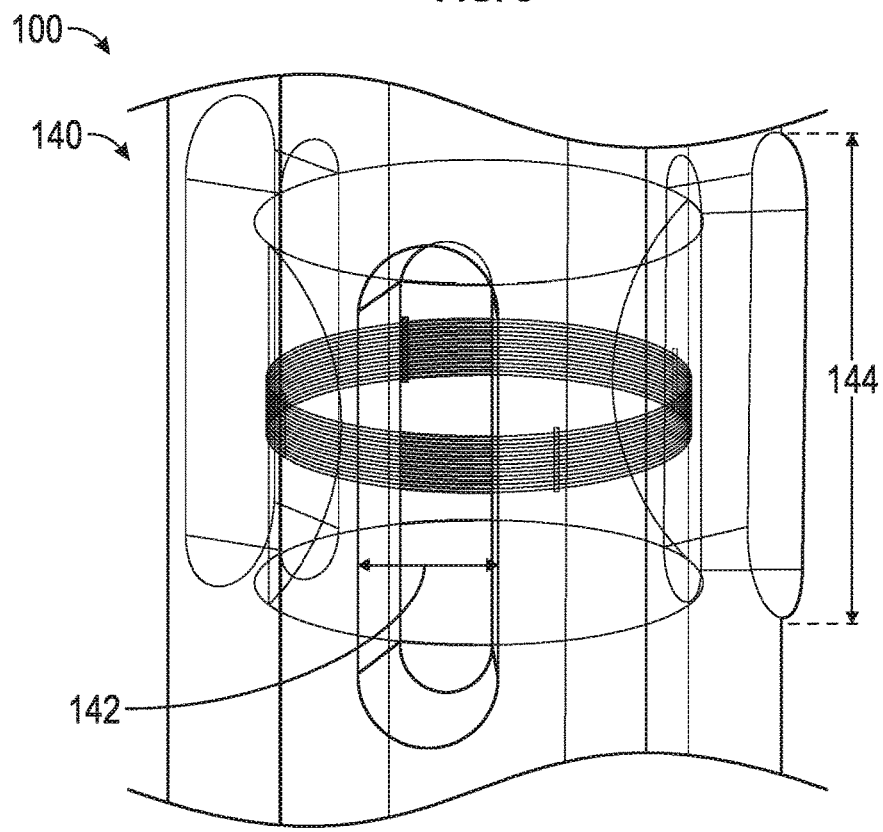

FIG. 6 depicts the collar 130 of the downhole tool 100 having three windows 140 formed therein. The windows 140 are circumferentially-offset from one another by from about 105 degrees to about 135 degrees (e.g., 120 degrees). The width 142 of the windows 140 may be from about 3 cm to about 5 cm (e.g., about 3.8 cm), and the length 144 of the windows 140 may be from about 10 cm to about 18 cm (e.g., about 14 cm).

Figure 7:
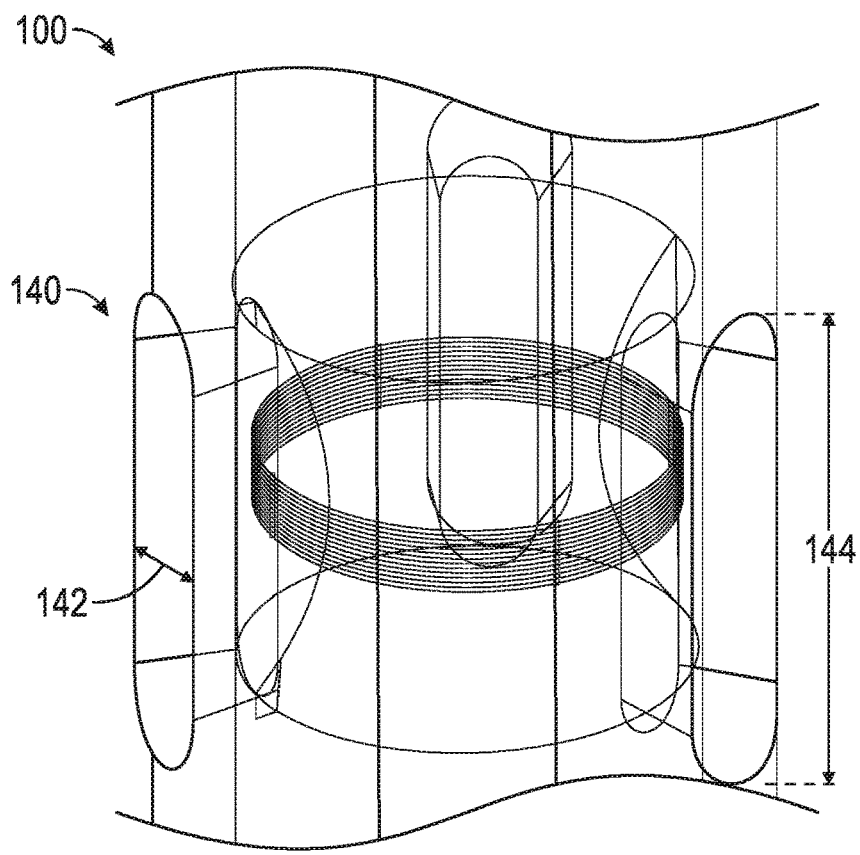

FIG. 7 depicts the collar 130 of the downhole tool 100 having three windows 140 formed therein. The windows 140 are circumferentially-offset from one another by from about 105 degrees to about 135 degrees (e.g., 120 degrees). The width 142 of the windows 140 may be from about 3 cm to about 5 cm (e.g., about 3.8 cm), and the length 144 of the windows 140 may be from about 9 cm to about 17 cm (e.g., about 12.7 cm).

Figure 8:
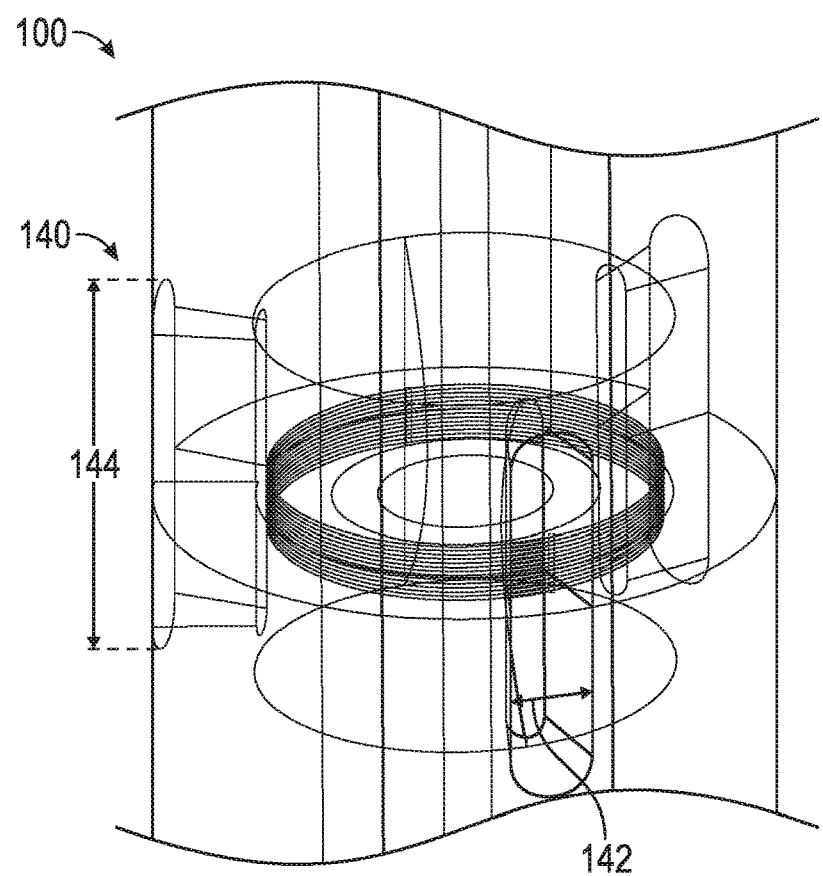

FIG. 8 depicts the collar 130 of the downhole tool 100 having three windows 140 formed therein. The windows 140 are circumferentially-offset from one another by from about 105 degrees to about 135 degrees (e.g., 120 degrees). The width 142 of the windows 140 may taper radially-outward from about 0.7 cm to about 1.5 cm (e.g., about 1.1 cm) proximate to the inner surface of the collar 130 to from about 2 cm to about 3 cm (e.g., about 2.4 cm) proximate to the outer surface of the collar 130. The length 144 of the windows 140 may be from about 7 cm to about 15 cm (e.g., about 11.3 cm).

Figure 9:
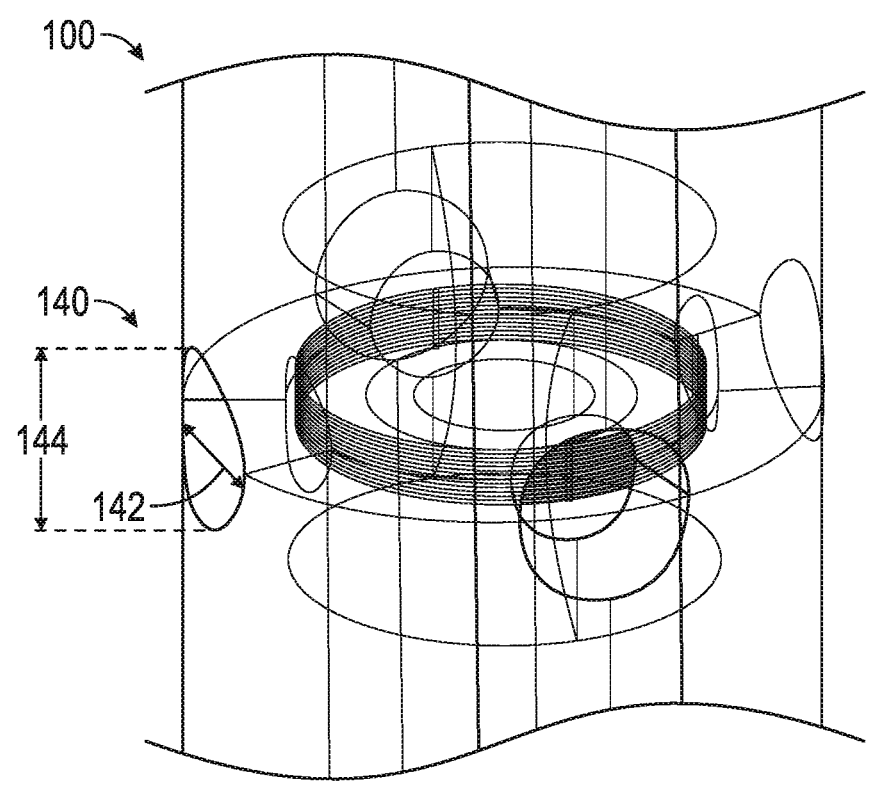

FIG. 9 depicts the collar 130 of the downhole tool 100 having four windows 140 formed therein. The windows 140 are circumferentially-offset from one another by from about 75 degrees to about 105 degrees (e.g., 90 degrees). The width 142 of the windows 140 may taper radially-outward from about 3 cm to about 5 cm (e.g., about 3.7 cm) proximate to the inner surface of the collar 130 to from about 4 cm to about 6 cm (e.g., about 5 cm) proximate to the outer surface of the collar 130. The length 144 of the windows 140 may taper from about 3 cm to about 5 cm (e.g., about 3.7 cm) proximate to the inner surface of the collar 130 to from about 4 cm to about 6 cm (e.g., about 5 cm) proximate to the outer surface of the collar 130. Thus, the windows 140 may be circularly-tapered. Although five different collar designs are shown in FIGS. 5-9, it will be appreciated that these designs are illustrative, and the number, length, width, and shape of the windows 140 in the collar 130 may vary depending at least partially upon the properties of the electromagnetic signals, the material of the collar 130, and the thickness 132 of the collar 130.

Table 1 below illustrates the magnetic moments and impedances for the embodiments shown in FIGS. 5-9.

tromagnetic modeling may be combined with mechanical modeling to find an optimum geometry of the windows 140.

The edge current effect may cause the electromagnetic field of the antenna 120 close to the wellbore to have an asymmetric pattern. Using the collar 130 shown in FIG. 6 as an example, the field close to the antenna 120 may be asymmetric and, thus, may not resemble dipole antenna pattern. However, closer to the computation domain edge r=1 m, the electromagnetic field may resemble the dipole antenna pattern.

Figure 10:
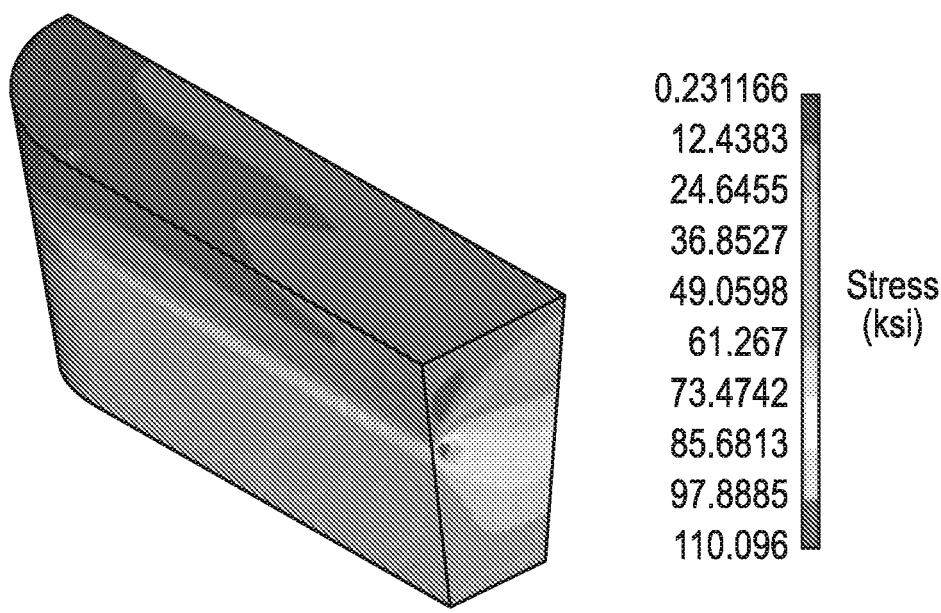
FIGS. 10 and 11 depict the distribution of equivalent Von-Misses stresses in a portion of a first insert (FIG. 10) and a portion of a second insert (FIG. 11).
Figure 11:
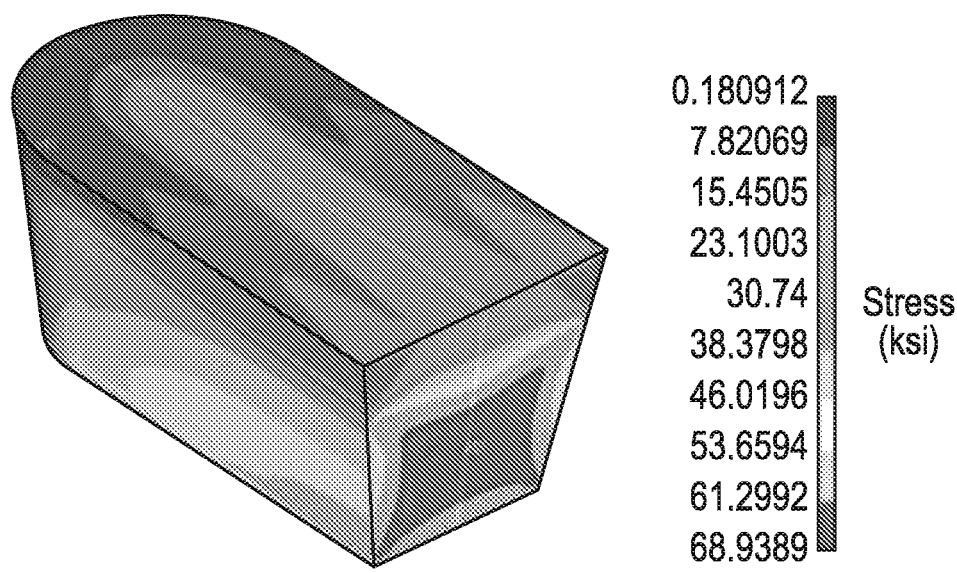

The shapes, sizes, and materials used in the downhole tool 100 may reduce the stress in the parts subjected to hydrostatic pressure, make the stress distribution more uniform, and avoid high tensile and shear stress in the insert 150. FIGS. 10 and 11 depict the distribution of equivalent Von-Misses stresses in a portion of a first insert 1050 (FIG. 10) and a portion of a second insert 1150 (FIG. 11), according to an embodiment. The maximum stress in the first insert 1050 is about 110 ksi, and the maximum stress in the second insert 1150 is about 68 ksi. Thus, the modifications made to the second insert 1150 may reduce the stress on the insert 1150 by 40% or more and make the stress on the second insert 1150 more uniform.

The signal strength of the antenna 120 in the downhole tool 100 has been measured by a sensor coil placed around collar 130. The antenna 120 was excited with a current of 1 amp at frequencies of 400 kHz and 2 MHz. The output voltage from the sensor coil was measured. The position and orientation of the sensor coil was varied manually to obtain the strongest output signal. The same testing was performed on a conventional downhole tool design. The downhole tool 100 described herein exhibited a 30% greater output voltage from the sensor coil at both frequencies when compared to the conventional downhole tool.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction

TABLE 1

|  |  | Collar 1 (FIG. 5) | Collar 2 (FIG. 6) | Collar 3 (FIG. 7) | Collar 4 (FIG. 8) | Collar 5 (FIG. 9) |
|---|---|---|---|---|---|---|
| Magnetic moment ($A \cdot m^2$) | 400 kHz | 0.0098 | 0.0125 | 0.0112 | 0.00176 | 0.0013 |
|  | 2 MHz | 0.0094 | 0.0122 | 0.0113 | 0.00143 | 0.00123 |
| Self impedance (ohm) | 400 kHz | 1.17 + i*20.54 | 0.946 + i*22.38 | 0.942 + i*22.28 | 1.072 + i*19.42 | 0.836 + i*21.26 |
|  | 2 MHz | 2.79 + i*99.14 | 2.21 + i*109.1 | 2.21 + i*108.58 | 2.515 + i*93.90 | 1.98 + i*103.78 |

The magnetic moment may be in the Z-direction, ignoring the imaginary part, which may be much smaller than the real part. The signals from the antenna 120 may increase in strength as the magnetic moment increases and/or the impedance decreases. It may be assumed that the input current is 1 amp. The results are based upon an antenna 120 having 10 coils and a radius of 0.0567 m. As may be seen from the results in Table 1, the number of windows 140, the width 142 of the windows 140, and the length 144 of the windows 140 may affect the strength of the electromagnetic signals. For example, as the number of windows 140 in the collar 130 increases, the strength of the electromagnetic signals transmitted through the collar 130 also increases. Similarly, as the width 142 and/or length 144 of the windows 140 increases, the strength of the electromagnetic signals transmitted through the collar 130 also increases. The elecor spatial orientation. The terms "couple," "coupled," "connect," "connection," "connected," "in connection with," and "connecting" refer to "in direct connection with" or "in connection with via one or more intermediate elements or members."

Although the preceding description has been described herein with reference to particular means, materials, and embodiments, it is not intended to be limited to the particulars disclosed herein; rather, it extends to all functionally equivalent structures, methods, and uses, such as are contemplated within the scope of the appended claims. While the foregoing is directed to embodiments of the present invention, other and further embodiments of the invention may be devised without departing from the basic scope thereof.

What is claimed is:

1. A downhole tool, comprising:
a chassis having a bore formed axially-therethrough;
an antenna positioned radially-outward from the chassis;
a collar positioned radially-outward from the antenna, wherein a window is defined radially-through the collar;
an insert positioned in the window, wherein the insert is made at least partially of a ceramic material; and
wherein the insert is sized and shaped such that (i) circumferential sides of the insert are in contact with the collar at corresponding circumferential sides of the window, (ii) axial ends of the insert are not in contact with the collar at corresponding axial ends of the window, and (iii) the length of the insert is less than the length of the window.

2. The downhole tool of claim 1, wherein the window is axially-aligned with the antenna.

3. The downhole tool of claim 1, wherein the collar comprises two or more windows that are circumferentially-offset from one another.

4. The downhole tool of claim 1, wherein a cross-sectional shape of the window, when taken through a plane that is perpendicular to a central longitudinal axis through the bore, is substantially frustoconical.

5. The downhole tool of claim 1, wherein a width of the window increases moving radially-outward.

6. The downhole tool of claim 1, wherein the insert forms a friction fit with the window.

7. The downhole tool of claim 1, wherein the collar defines a recess in a circumferential surface that defines the window, and wherein a seal is positioned at least partially in the recess and between the collar and the insert.

8. The downhole tool of claim 1, wherein an area between the chassis and the antenna is from about 10 $cm^2$ to about 100 $cm^2$.

9. The downhole tool of claim 1, wherein (i) the collar comprises a plurality of circumferentially spaced window and inserts, and (ii) the chassis comprises a plurality of integral ribs that extend radially-outward therefrom, the ribs supporting an inner surface of the collar circumferentially between the windows.

10. The downhole tool of claim 1, wherein (i) the collar comprises a plurality of circumferentially spaced windows and inserts, and (ii) the collar further comprises a corresponding plurality of circumferentially spaced recesses formed in an outer surface thereof, each recess being formed between corresponding ones of the windows.

11. A downhole tool, comprising:
a chassis having a bore formed axially-therethrough;
an antenna positioned radially-outward from the chassis, wherein an area between the chassis and the antenna is from about 30 $cm^2$ to about 100 $cm^2$;
a collar positioned radially-outward from the antenna, wherein a plurality of windows are defined radially-through the collar, wherein the windows are axially-aligned with the antenna, and wherein the windows are circumferentially-offset from one another;
a plurality of inserts, wherein each of the inserts is positioned in a respective one of the windows, wherein a width of at least one of the inserts increases moving radially-outward, and wherein at least one of the inserts is at least partially made of a ceramic material; and
wherein each of the inserts is sized and shaped such that (i) circumferential sides thereof are in contact with the collar at circumferential sides of the corresponding window, (ii) axial ends of the insert are not in contact with the collar at corresponding axial ends of the window, and (iii) the length of the insert is less than the length of the window.

12. The downhole tool of claim 11, wherein there is no layer of rubber or fiberglass wrapped around a central longitudinal axis of the bore and positioned radially-outward from the antenna.

13. The downhole tool of claim 11, wherein there is no layer positioned radially-outward from the collar.

14. The downhole tool of claim 11, wherein the chassis comprises a plurality of integral ribs that extend radially-outward therefrom, the ribs supporting an inner surface of the collar circumferentially between the windows.

15. The downhole tool of claim 11, wherein the collar further comprises a corresponding plurality of circumferentially spaced recesses formed in an outer surface thereof, each recess being formed between corresponding ones of the windows.

* * * * *